US007143071B2

(12) United States Patent
Chen et al.

(10) Patent No.: US 7,143,071 B2
(45) Date of Patent: Nov. 28, 2006

(54) METHOD FOR CHANGING CPU FREQUENCY UNDER CONTROL OF NEURAL NETWORK

(75) Inventors: I-Larn Chen, Banchiau (TW); Yuh-Dar Tseng, Yunghe (TW)

(73) Assignee: Via Technologies, Inc., Taipei (TW)

( * ) Notice: Subject to any disclaimer, the term of this patent is extended or adjusted under 35 U.S.C. 154(b) by 889 days.

(21) Appl. No.: 10/092,906

(22) Filed: Mar. 8, 2002

(65) Prior Publication Data
US 2002/0171603 A1  Nov. 21, 2002

(30) Foreign Application Priority Data
Apr. 12, 2001  (TW) .............................. 90108827 A

(51) Int. Cl.
G06E 1/00 (2006.01)
G06E 3/00 (2006.01)
G06F 15/18 (2006.01)
G06G 7/00 (2006.01)
G06G 1/00 (2006.01)
G05B 13/02 (2006.01)
G06N 3/06 (2006.01)
G06N 3/063 (2006.01)
G06N 3/067 (2006.01)

(52) U.S. Cl. .............................. 706/19; 706/23; 706/39
(58) Field of Classification Search .................. 706/15, 706/45, 900, 1, 19, 23, 39; 375/354; 700/1, 700/90; 704/256; 701/110; 713/322, 501
See application file for complete search history.

(56) References Cited
U.S. PATENT DOCUMENTS 6,092,018 A * 7/2000 Puskorius et al. .......... 701/110
6,163,583 A * 12/2000 Lin et al. .................... 375/354
6,216,234 B1 * 4/2001 Sager et al. ................. 713/501
6,219,642 B1 * 4/2001 Asghar et al. .............. 704/256.8
6,715,089 B1 * 3/2004 Zdravkovic .................. 713/322

OTHER PUBLICATIONS

HP Kayak XU800 PC Workstation Technical Reference Manual; Hewlett-Packard France, Business Desktop Division (BDD), France 1999.*
On-line adaptive chaotic demodulator based on radial-basis-function neural networks: Jiu-chao Feng, Chi K. Tse, Jan. 17, 2001, American Physical Society, 1063-651X/2001/63(2)/026202(10), 63 026202-1 026202-10.*
Efficient Simulation of Finite Automata by Neural Nets; Noga Alon, A. K. Dewdney, Teunis J. Ott, Apr. 1991, Journal of the Association for Computing Machinery, vol. 38, No. 2.*
'On-line adaptive chaotic demodulator based on radial-basis-function neural neyworks':Jiu-chao Feng, Chi K. Tse, Feb. 2001, Physical Review E vol. 63, 026202, 026202-1 to 026202-10.*
HP Kayak UX800 PC Workstation, Technical Reference Mannual, 1999, Hewlett-Packard France, Business Desktop Division, pp. 104, 30, 31, 10.*

* cited by examiner

Primary Examiner—David Vincent
Assistant Examiner—Peter Coughlan
(74) Attorney, Agent, or Firm—Rabin & Berdo, P.C.

(57) ABSTRACT

A method for changing the CPU frequency under control of a neural network. The neural network has m basis functions and n basis points that are connected together. Using the learning capability of the neural network to deduce basis weights based on dummy environmental parameters and a dummy output vector. In an application procedure, environmental parameters are input to the basis points and basis vectors are calculated based on the basis functions. Integrating the multiplication of each basis vector and its corresponding basis weight, an output vector can be generated to determine a control signal so that the CPU can be controlled to raise or lower its operating frequency. In addition, if the user has to change the parameters due to behavior, a fast learning function of a radial neural network can be used for complying with each user's behavior.

18 Claims, 5 Drawing Sheets

METHOD FOR CHANGING CPU FREQUENCY UNDER CONTROL OF NEURAL NETWORK

CROSS-REFERENCE TO RELATED APPLICATION

This application claims the priority benefit of Taiwanese application serial no. 90108827, filed Apr. 12, 2001.

BACKGROUND OF THE INVENTION

1. Field of the Invention

This invention relates in general to a method for dynamically controlling a central processing unit (CPU). More specifically this invention relates to a method for dynamically controlling a CPU under the control of a neural network.

2. Description of Related Art

Recently, the electronic and electric industrials make great technological innovations because of the progressive semiconductor technology. Due to the great developments of the high technologies, the personal computers (PCs) have become more popular all over the world and further build a real and fantastic global village through the Internet. Leading by the technology, the information era has come to the world ineffably.

Regarding the PCs, desktop computers are major products. However, each component of the computer, such as the host machine, the monitor, the keyboard and the mouse, occupies the desk that the computer is set. Therefore, in addition to wasting the setting space for the computer, the mobility of the computer is worse because the desktop computer cannot be so easily moved from one place to another at will. However, under the researchers' and the developers' efforts, a notebook (laptop) computer has been developed and commercialized toward a small, thin and compact product. Because of its high convenience, the notebook computer has become an indispensable weapon for commerce and business and an important product in the field of PC-related products.

Although people cannot resist the mobility of the notebook computer, the power supply and heat issues are still existed difficulties for the notebook computer. Therefore, the developers and researchers do their best to find a way to reduce the power consumption and to extent the working time of the battery of the notebook computer. The operation frequency of the CPU is determined by both an external frequency and a clock multiplier factor (for example 4.5×, or 5×). Therefore, if the computer system can adjust the clock multiplier factor and the operating voltage (for example, 1.6V~0.975V) according to the condition when the computer is working, the CPU frequency can be raised (to increase the clock multiplier factor) to increase the operation efficiency in the condition that the CPU is busy (or a higher CPU usage rate) even though the external frequency (66 or 100 MHz currently) is fixed. In addition, when the computer system is idle, the CPU frequency can be lowered (to decrease the clock multiplier factor) to save power. Accordingly, the computer system will dynamically adjust the operation frequency of the CPU based on the CPU usage condition so that the power save and heat problems can be solved.

However, in practice, the above method is very difficult to implement because the clock multiplier factor has been fixed when the CPU is made. For example, the CPU made by Intel or AMD has a fixed clock multiplier factor that cannot be adjusted. To alter the operation frequency of the CPU, the only way is to change the external frequency. Currently, the external frequency is changed by jumps on the motherboard or BIOS. Once the operating system is loaded, the external frequency cannot be changed any more. Therefore, conventionally, it is impossible to dynamically adjust the operation frequency of the CPU with a fixed clock multiplier factor.

Recently, a new developed CPU with a code name "SAMUEL" has no a fixed clock multiplier factor, which can be adjusted according to user's actual demand such that the CPU performance increases. Under such a CPU configuration, it is very possible to adjust the clock multiplier factor for the CPU to save the power consumption. How to make the computer system to adjust the clock multiplier factor based on various situations without rebooting the computer system is the key issue of the invention.

SUMMARY OF THE INVENTION

According to the object(s) mentioned above, it is an object of the invention to provide a method for changing an operating frequency of the CPU under the control of a neural network is provided, by which the CPU clock multiplier factor can be adjusted without rebooting the computer so that the power is saved.

Therefore, the invention provides a method for changing an operating frequency of the CPU under the control of a neural network, which comprises following steps. In the neural network, there are m basis functions and n basis points, wherein connections are made among the basis points and the basis functions. When n environmental parameters are respectively input to the n basis points, m basis vectors can be obtained by calculating based upon the basis functions. Integrating the multiplication of each basis vector and its corresponding weight vector, an output vector can be generated to determine a control signal so that the CPU can be controlled to raise or lower its operating frequency. In practice, each weight vector can be obtained according to a learning procedure of the neural network, and then a calculation based upon the learned basis weights and the basis vectors is performed to obtain the output vector. When the neural network learns, few environmental parameters and an output vector based upon these environmental parameters can be preset in advance. Thereafter, the neural network deduces m basis weights according to the preset environmental parameters and the preset output vector. After learning, the basis weights can be properly defined. When an application procedure is executed, the n environmental parameters can be input to the basis points respectively and the basis vectors can be calculated from the basis functions. After the basis vectors are calculated with the learned basis weights correspondingly, the output vector is obtained so that the CPU frequency can be raised or lowered.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

Figure 1:
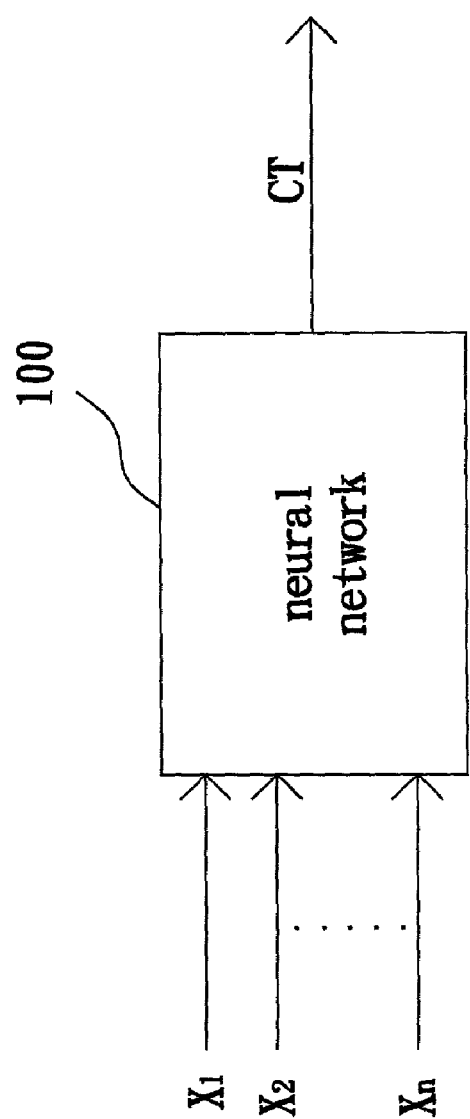
FIG. 1 shows a schematic block diagram of the method for changing the CPU frequency under the control of a neural network according to the embodiment of the invention.

FIG. 1 shows a schematic block diagram of the method for changing the CPU frequency under the control of a neural network according to the embodiment of the invention. In practice, environmental parameters, that are possible to affect a usage rate of the CPU, are inputted to each basis point (not shown) of the neural network 100. The neural network 100 calculates and evaluates the environmental parameters to determine a clock multiplier factor for the CPU. For example, the environmental parameters $X_1$, $X_2$, ..., $X_n$, capable of affecting the usage rate of the CPU, can be a current clock multiplier factor, a previous clock multiplier factor, a data accessing condition for an IDE (Intelligent Drive Electronics) controller, a data accessing condition for a DMA (Direct Memory Access) controller, a data accessing condition for an AGP (Accelerated Graphics Port) interface, and a data accessing condition for an PCI (Peripheral Component Interconnect)interface, etc.

As these environmental parameters are collected, a pattern that can affect the CPU efficiency is therefore made. After each of the environmental parameters in the pattern is calculated by the neural network 100, a calculated result is outputted as a control signal CT for changing the CPU frequency. For example, if a result calculated by the neural network 100 from the environmental parameters $X_1$, $X_2$, ..., $X_n$ is 35, then the control signal CT is 35 so that the clock multiplier factor for the CPU is set to 3.5×. Similarly, if a calculated result is 40, then the control signal CT is 40 so that the clock multiplier factor for the CPU is set to 4×. In addition, if a calculated result is 72, then the control signal CT can be set to 70 so that the clock multiplier factor for the CPU is set to 7× because 70 is closer to 72 than 75, or if a calculated result is 88, then the clock multiplier factor for the CPU is set to 9× because 90 is closer to 88. For a simpler way, the neural network 100 can merely outputs the control signal CT for the control of changing the CPU frequency. The detail principle of the neural network will be described in following paragraphs.

Figure 2:
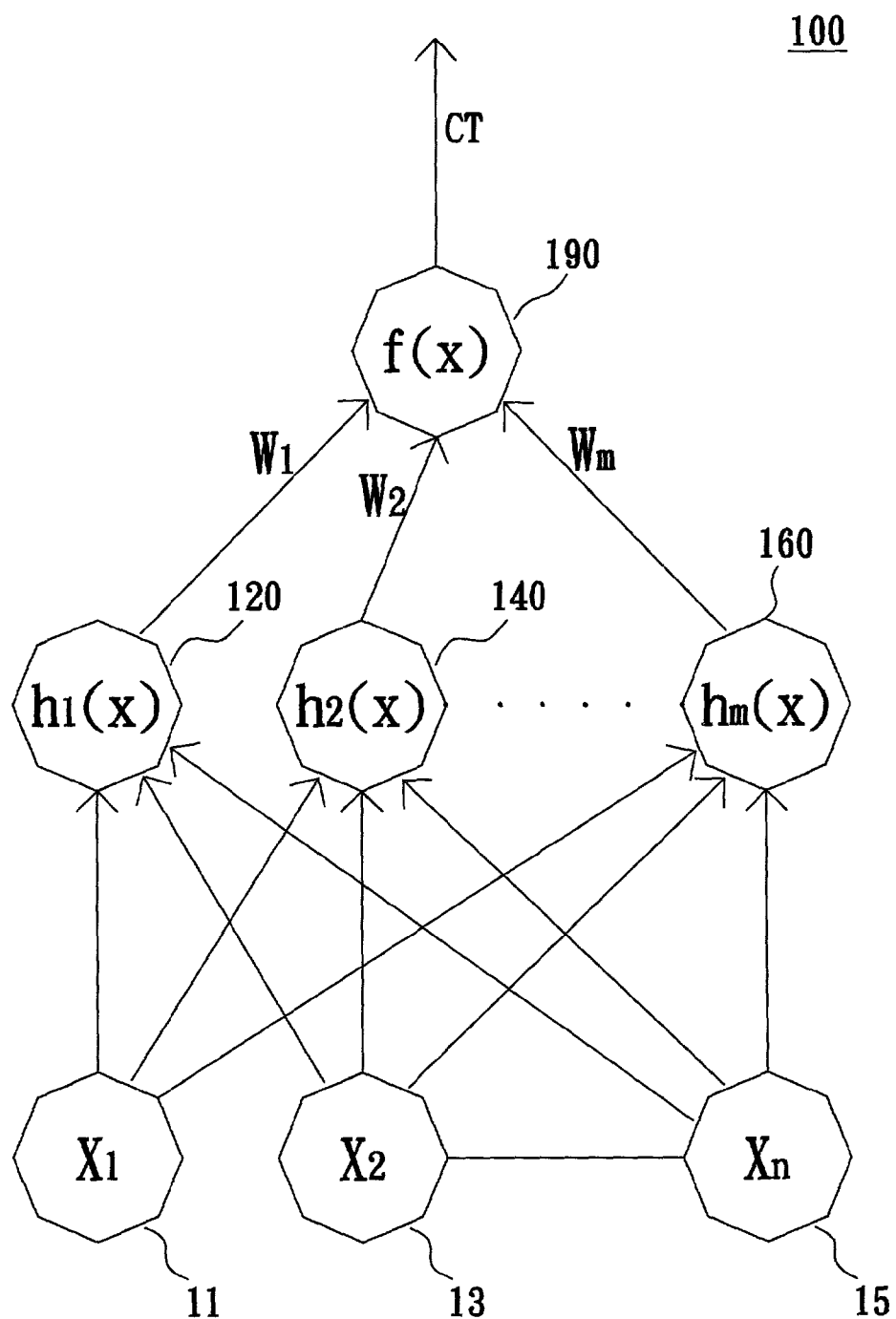
FIG. 2 schematically shows a radial neural network structure.

FIG. 2 schematically shows a radial neural network structure. The neural network 100 mentioned above can be the radial neural network in FIG. 2 or other neural network types. Taking the radial neural network structure as an example, the neural network 100 has three layers, of which the lowest layer comprises basis points (the basis points 11, 13 and 15 as shown) and each basis point is used for receiving the environmental parameter (such as environmental parameters $X_1$, $X_2$, ..., $X_n$ in FIG. 2). After each environmental parameter is calculated according to m basis functions, m basis vectors are created, for example the basis vectors 120, 140, 160 and so on that correspond to functions $h_1(x)$, $h_2(x)$, ..., and $h_m(x)$ respectively. These functions $h_1(x)$, $h_2(x)$, ..., and $h_m(x)$ form a intermediate layer of the neural network 100.

Afterwards, different weights are multiplied with their corresponding basis vectors or functions $h_1(x)$, $h_2(x)$, ..., and $h_m(x)$ to obtained an output vector 190, corresponding a function f(x), of the upmost layer of the neural network 100. Therefore, the control signal CT can be defined according to the output vector 190 (or function f(x)), and then a clock multiplier factor for the CPU can set in the manner described above. According to the above configuration, the mathematical expression between the output vector and the basis vectors can be expressed in the following equation (1).

$$f(x) = \sum_{j=1}^{m} w_j h_j(x) \tag{1}$$

Figure 3A:
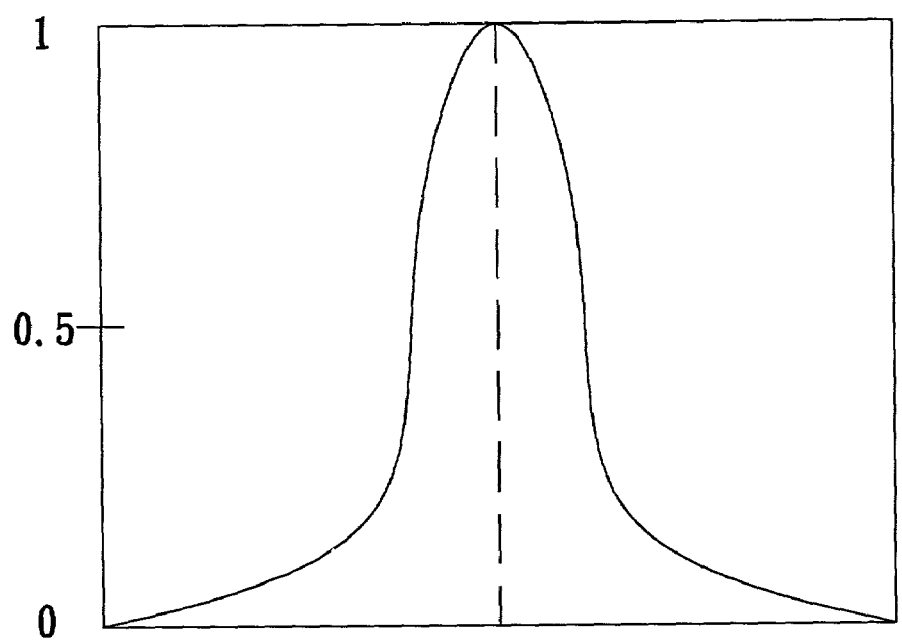
FIG. 3A schematically shows a graph of a Gaussian function.

In equation (1), $w_j$ is the weight vector and corresponds to each basis vector. Integrating basis weights $w_j$ multiplying with their corresponding basis vectors $h_j(x)$ and then integrating the summation of the multiplications, the output vector 190 (function f(x)) is obtained. Because each environmental parameter has influence on the CPU clock multiplier factor, it is very important to choose proper basis functions for reflecting the importance of each environmental parameter. In practice, a radial basis function can be used for magnifying the influence of the variation of the environmental parameter on the CPU clock multiplier factor. The radial basis function is a special function characterized by that it is an increasing or decreasing function away from its graphic center, for example, a Gaussian function or a multiquadric function. FIG. 3A shows a graph of a Gaussian function. In general, the Gaussian function can be expressed as equation (2).

$$h(x) = \exp\left(-\frac{(x-c)^2}{r^2}\right) \tag{2}$$

Figure 3B:
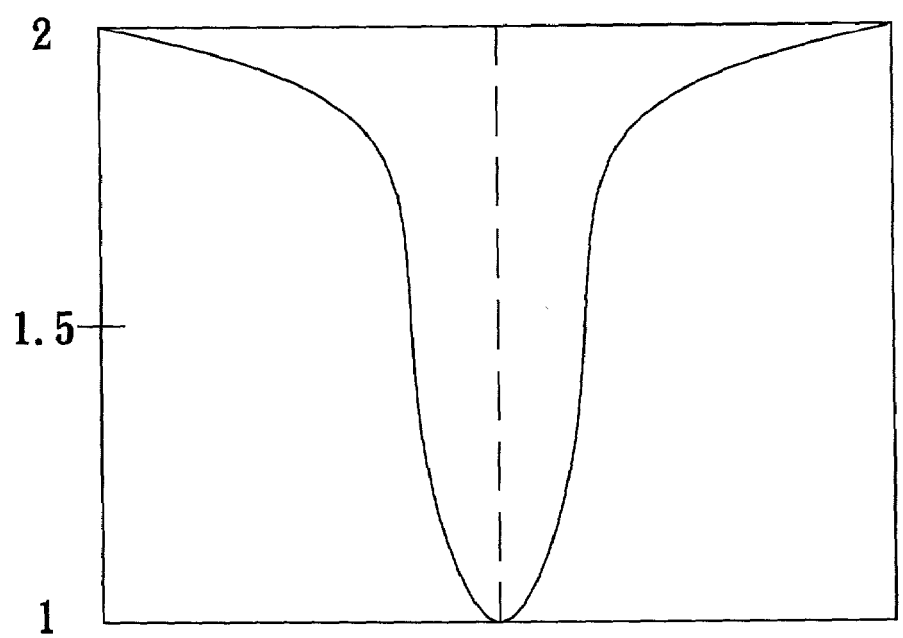
FIG. 3B schematically shows a graph of a multiquadric function.

In equation (2), c is the graphic center and r is a adjusting range. As shown in FIG. 3A, the function h(x) reaches its maximum when x=c, and the value of the function h(x) decreases greatly when x is far beyond the graphic center c. Using the characteristic of the Gaussian function, the influence of each environmental parameter on the CPU clock multiplier factor can be outstood. In addition to the Gaussian function, there are other special functions having such characteristic, for example the multiquadric function. FIG. 3B shows a graph of a multiquadric function. In general, the multiquadric function can be expressed as equation (3).

$$h(x) = \frac{\sqrt{r^2 + (x-c)^2}}{r} \tag{3}$$

In equation (3), c is the graphic center and r is a adjusting range. As shown in FIG. 3B, the function h(x) reaches its minimum when x=c, and the value of the function h(x) increases greatly when x is far beyond the graphic center c.

Using the characteristic of the multiquadric function, the influence of each environmental parameter on the CPU clock multiplier factor can be outstood. It should be noted that the Gaussian function and the multiquadric function are only examples for the basis function, and other special functions can be also provided for complies with the basis function, which are not described in detail herein. Next, the learning capability and the related applications of the neural network are discussed below.

First, the learning procedure is described. When the neural network learns, the environmental parameters of the pattern have to be inputted to the basis points and a desired output vector is set according to when the neural network uses the pattern. Accordingly, the neural network can evaluate basis weights for respective environmental parameters according to the calculations of the known basis functions, the output vector and the environmental parameter input to the basis point. After repeatedly learning, the basis weights become more accurate. As the learning process is finished, the basis weights can be therefore determined. Thereafter, as the environmental parameter for the basis point is changed, the neural network can find a meaningful output vector by the calculations from the basis functions and different basis weights to control the CPU clock multiplier factor or to perform other controls.

Next, using the change of the clock multiplier factor as a pattern to describe the learning procedure of the neural network. FIG. 4A shows a relationship between vectors of the neural network when the clock multiplier factor increases gradually. The environmental parameter input to the basis point 11 of the neural network 100 represents a clock multiplier factor for the CPU at time t1, the environmental parameter input to the basis point 13 represents a clock multiplier factor for the CPU at time t2 and the environmental parameter input to the basis point 15 represents a clock multiplier factor for the CPU at time t3, wherein t1<t2<t3.

As shown in FIG. 4A, the clock multiplier factor is 2× at time t1, 3× at time t2 and 4× at time t3. Namely, the clock multiplier factor increases (from 2, 3, to 4) with time. Keeping this increasing trend, the next clock multiplier factor should be 5×. Accordingly, the control signal CT can be set to 50, that represents the clock multiplier factor is 5×, as the output vector 190 of the neural network 100. The neural network 100 calculates out basis weights $W_{11}$, $W_{21}$, and $W_{31}$, for example, based upon the output vector 190 and the environmental parameters input to the basis points. It should be noted that it is not possible for the neural network 100 to learn the most suitable basis weights according to only one set of patterns, and therefore further learning is required.

Figure 4B:
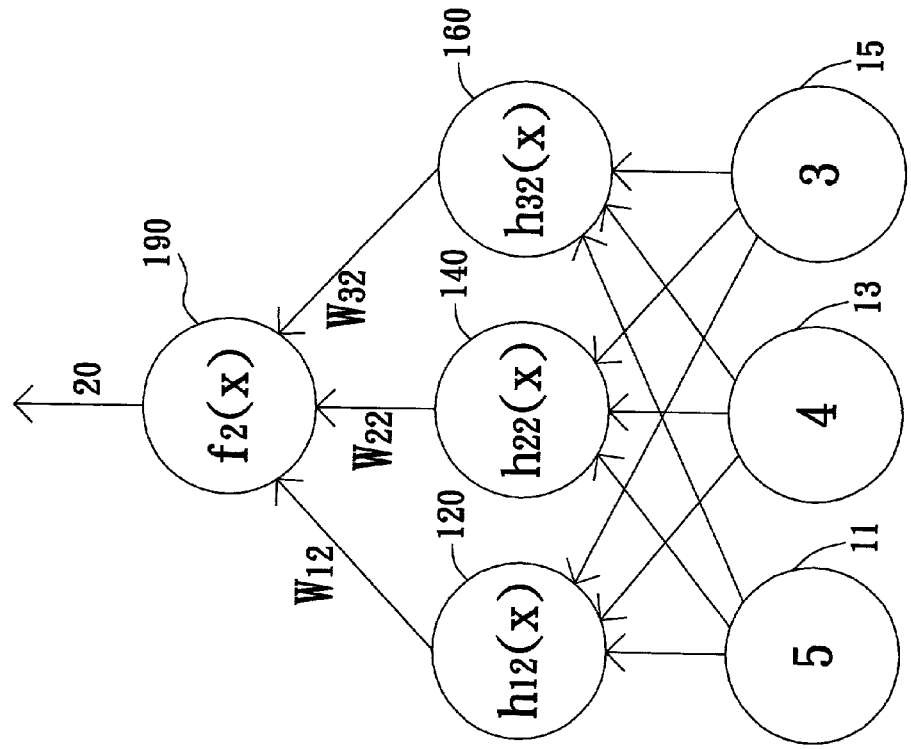
FIG. 4B shows a relationship between the decrement of the clock multiplier factor and the vectors when the neural network in FIG. 2 is learning.
Figure 4A:
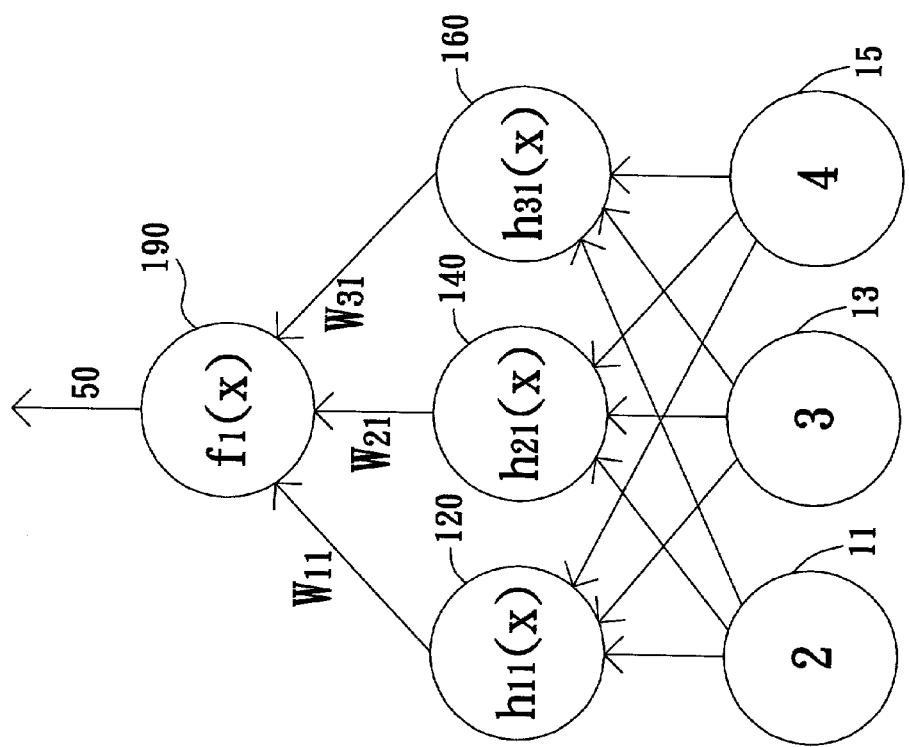
FIG. 4A shows a relationship between the increment of the clock multiplier factor and the vectors when the neural network in FIG. 2 is learning.

Next, as shown in FIG. 4B, another set of patterns (5, 4 and 3, for example) is input to the basis points 11, 13, 15 respectively. The clock multiplier factor decreases from 5, 4, to 3 with time. Keeping this increasing trend, the next clock multiplier factor should be 2×. Accordingly, the control signal CT can be set to 20, that represents the clock multiplier factor is 2×, as the output vector 190 of the neural network 100. The neural network 100 calculates out basis weights $W_{12}$, $W_{22}$, and $W_{32}$, for example, based upon the output vector 190 and the environmental parameters input to the basis points. In order to obtain more accurate basis weights, the neural network can learn furthermore. For example, as shown in FIG. 4C, another set of patterns (2, 4 and 6, for example) is input to the basis points 11, 13, 15 respectively, which means the clock multiplier factor varies to increase discontinuously. In other word, if this trend is not changed, the nest clock multiplier factor should be 8×. Accordingly, the control signal CT can be set to 80, that represents the clock multiplier factor is 8×, as the output vector 190 of the neural network 100. The neural network 100 can define basis weights $W_{13}$, $W_{23}$, and $W_{33}$, for example, based upon the output vector 190 and the environmental parameters input to the basis points. Assuming the neural network 100 has finished the learning procedure, then the basis weights $W_{13}$, $W_{23}$, and $W_{33}$ are the final result. Afterwards, a proper clock multiplier factor can be determined using the basis vectors and basis weights by changing the environmental parameters input to the basis points so that the CPU frequency can be control to raise or lower.

Figure 4D:
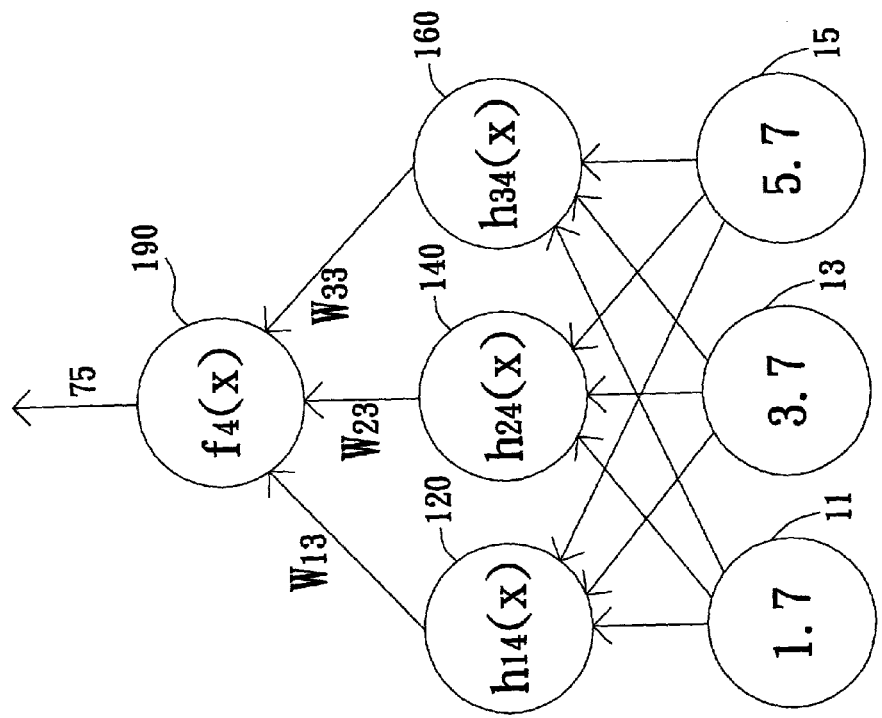
FIG. 4D shows a relationship between the vectors when the neural network in FIG. 2 is in application.
Figure 4C:
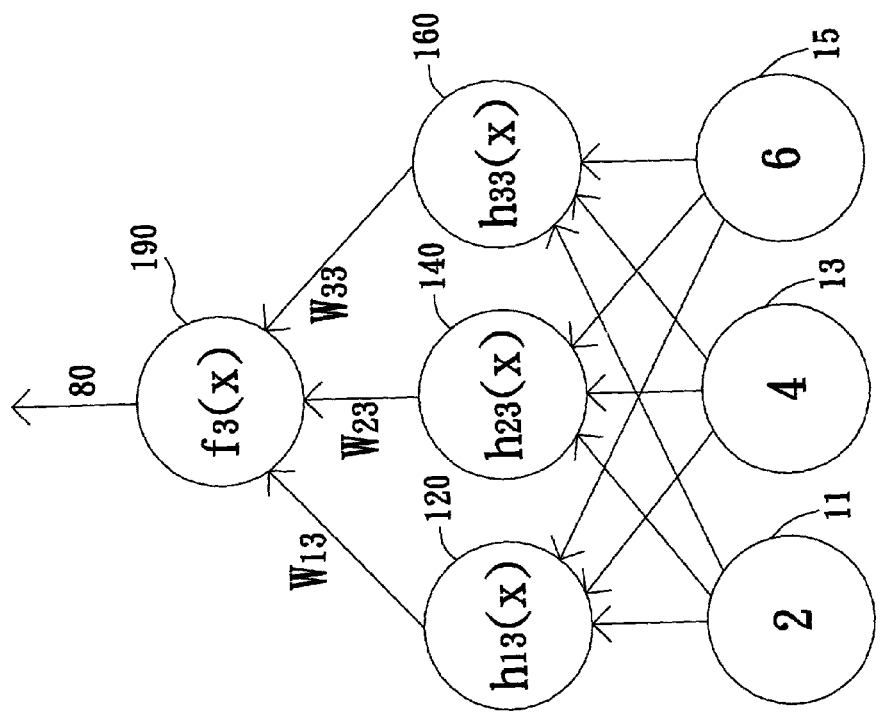
FIG. 4C shows a relationship between the discontinuous increment of the clock multiplier factor and the vectors when the neural network in FIG. 2 is learning.

As shown in FIG. 4D, for example, if a set of patterns has clock multiplier factors 1.7, 3.7 and 5.7 in sequence, the output vector 190 is then generated nearby 77 after the neural network 100 perform a calculation based on the environmental parameters input to the basis points. By simple a calculation, the control signal is set to 75, that represents a clock multiplier factor 7.5× since the clock multiplier factor nearest to 77 is 7.5×, and then the CPU is control to operate under the clock multiplier factor 7.5×.

In practice, the output vector is not simply determined only by the variation of the clock multiplier factor. All environmental parameters that can affect the CPU efficiency can be input to the basis points of the neural network in order to find a most suitable clock multiplier factor according to the calculation of the neural network. For example, the current clock multiplier factor, the previous clock multiplier factor, the data accessing condition for the IDE controller, the data accessing condition for the DMA controller, the data accessing condition for the AGP interface, and the data accessing condition for the PCI interface, etc. can be input to the basis points of the neural network as the pattern. Once the environmental parameters input to the basis points change, the output result is affected immediately. Namely, when the neural network is learning, the patterns are diverse such that the evaluated result can be objective and just.

In order to clarify the causal relationship among the vectors in the learning procedure and the application procedure for the neural network, the vector name can be redefined according to different procedure executed by the neural network. In other word, when the neural network is in learning, the basis weights are obtained according to both the environmental parameters and the output vector that are set by the neural network itself, and when the neural network is in application, the output vector is determined according to the actual environmental parameters and the basis weights. Because the objects in the learning procedure and the application procedure are different, the output vector and the environmental parameters during the learning procedure are a dummy output vector and dummy environmental parameters, which are used for learning the most suitable basis weights. After the learning procedure is finished, the neural network calculates the basis vectors and the output vector according to the actual environmental parameters and the learned basis weights to adjust a proper clock multiplier factor, by which the CPU frequency can be controlled to raise or lower.

In practical application, the algorithm for the neural network mentioned above can be programmed as an application and executed under an operating system, for example, Windows etc. When the application is executed, a clock multiplier factor currently used can be shown in an application window. If the user deems the current clock multiplier factor is too high or low, the learning function of the neural network can be activated any time to comply with the user's requirement. For example, if the CPU is currently operated under a clock multiplier factor 5× and the user feels too slow, the user can change manually the clock multiplier factor from 5× to 6× and then activates the learning function of the neural network. At this time, the neural network will learn this adjustment. Having this experience, the neural network will automatically adjust the clock multiplier factor to 6× when the CPU is operated under the similar condition. Since the neural network possesses a large learning capability, the system becomes more intelligent, and can adjust the most suitable frequency for the CPU with respect to the individual behavior. Regarding a combination with hardware, the output vector can be used for controlling drivers whose output can adjust registers in the CPU and therefore the clock multiplier factor can be adjusted.

It should be noted that the parameters used in the embodiment are only an example, which is not used for limiting the scope of the invention. To those skilled in this art, the parameters can be adjusted and changed to achieve the function of the invention.

Advantageously, according to the invention, the clock multiplier factor for the CPU can be easily adjusted at any time without rebooting the computer. The system can adjust the clock multiplier factor dynamically depending on the CPU performance is high or low. In addition, the user can use an application program to set the clock multiplier factor at any time, and the system can further comply with the user's behavior by the large learning function of the neural network.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. A method for changing a frequency of a central processing unit (CPU) under the control of a neural network of a computer system, wherein the neural network comprises m basis functions, the method comprising steps of:
   (i) executing a learning procedures step (i) comprising:
      providing p dummy environmental parameters including data accessing conditions for an Intelligent Drive Electronics (IDE) controller, an Accelerated Graphics Port (AGP) interface, and a Peripheral Component Interconnect (PCI) interface;
      providing a dummy output vector; and
      calculating m basis weights by the neural network according to the p dummy environmental parameters and the dummy output vector; and
   (ii) executing an application procedure, step (ii) comprising:
      providing n environmental parameters that affect usage rate of the CPU with respect to components of the computer system when the CPU operates at a first frequency based on an external frequency;
      calculating m basis vectors by substituting the n environmental parameters into the m basis functions;
      calculating an output vector according to the m basis weights calculated in the learning procedure and the m basis vectors, wherein the output vector is determined according to a weighted sum of the m basis vectors with the in basis weights;
      determining a clock multiplier factor according to the output vector; and
      changing the frequency of the CPU according to the output vector by enabling the CPU to operate at a second frequency according to the clock multiplier factor and the external frequency, wherein m, n and p are positive integers.

2. The method of claim 1, wherein the neural network is a radial neural network.

3. The method of claim 1, wherein the basis functions comprise a radial basis function.

4. The method of claim 3, wherein the radial basis function is a Gaussian function.

5. The method of claim 3, wherein the radial basis function is a multiquadric function.

6. The method of claim 1, wherein the dummy environmental parameters comprise a clock multiplier factor that the CPU uses currently.

7. The method of claim 1, wherein the dummy environmental parameters comprise a clock multiplier factor that the CPU uses previously.

8. The method of claim 1, wherein in step (i), the data accessing condition for the IDE controller is a dummy environmental parameter with respect to data access of the IDE controller.

9. The method of claim 1, wherein the dummy environmental parameters comprise a data accessing condition for a DMA (Direct Memory Access) controller.

10. The method of claim 1, wherein in step (i), the data accessing condition for the AGP interface is a dummy environmental parameter with respect to data access of the AGP interface.

11. The method of claim 1, wherein in step (i), the data accessing condition for the PCI interface is a dummy environmental parameter with respect to data access of the PCI interface.

12. The method of claim 1, wherein the environmental parameters comprise a clock multiplier factor that the CPU uses currently.

13. The method of claim 1, wherein the environmental parameters comprise a clock multiplier factor that the CPU uses previously.

14. The method of claim 1, wherein the environmental parameters comprise a data accessing condition for an IDE (Intelligent Drive Electronics) controller.

15. The method of claim 1, wherein the environmental parameters comprise a data accessing condition for a DMA (Direct Memory Access) controller.

16. The method of claim 1, wherein the environmental parameters comprise a data accessing condition for an AGP (Accelerated Graphics Port) interface.

17. The method of claim 1, wherein the environmental parameters comprise a data accessing condition for a PCI (Peripheral Component Interconnect) interface.

18. A method for changing a frequency of a central processing unit (CPU) under the control of a neural network of a computer system, wherein the neural network comprises m basis functions, the method comprising steps of:
   (i) executing a learning procedure, step (i) comprising:
      providing p dummy environmental parameters including dummy environmental parameters with respect to data access of a storage drive controller of the computer system, a graphical display interface of the computer system, and a peripheral component interface of the computer system;
      providing a dummy output vector; and
      calculating m basis weights by the neural network according to the p dummy environmental parameters and the dummy output vector; and (ii) executing an application procedure, step (ii) comprising:
  providing n environmental parameters that affect usage rate of the CPU with respect to components of the computer system when the CPU operates at a first frequency based on an external frequency;
  calculating m basis vectors by substituting the n environmental parameters into the in basis functions;
  calculating an output vector according to the m basis weights calculated in the teaming procedure and the in basis vectors, wherein the output vector is determined according to a weighted sum of the in basis vectors with the m basis weights;
  determining a clock multiplier factor according to the output vector; and
  changing the frequency of the CPU according to the output vector by enabling the CPU to operate at a second frequency according to the clock multiplier factor and the external frequency, wherein in, n and p are positive integers.

* * * * *